H. WATKEYS.
Car-Axle.

No. 202,682. Patented April 23, 1878.

WITNESSES:
O. C. Lauss
J. C. A. de Lima

INVENTOR:
Henry Watkeys
by E. Lauss his Atty.

UNITED STATES PATENT OFFICE.

HENRY WATKEYS, OF SYRACUSE, NEW YORK.

IMPROVEMENT IN CAR-AXLES.

Specification forming part of Letters Patent No. 202,682, dated April 23, 1878; application filed March 6, 1878.

*To all whom it may concern:*

Be it known that I, HENRY WATKEYS, of the city of Syracuse, in the county of Onondaga, in the State of New York, have invented new and useful Improvements in Car-Axles, of which the following, taken in connection with the accompanying drawing, is a full, clear, and exact description.

This invention has reference to that class of car-axles which have one wheel attached to a sleeve fitted loosely to the axle, for the purpose of allowing the said wheel to revolve independent of its fellow wheel.

The object of the invention is to simplify and reduce the cost of construction, render the same more durable and safe in its operation, and facilitate its repair; and it consists, principally, of a sleeve composed of two or more longitudinal sections, secured to each other by one of the wheels pressed onto one end thereof, and a collar or supplemental sleeve fitted to the exterior at the opposite end, in combination with an axle having rigid shoulders at the ends of said sleeve.

It also consists in the combination and arrangement of a sleeve composed of two or more longitudinal sections, fitted between collars or shoulders forged or shrunk on the axle, so as to be permanently attached thereto, and of a smaller circumference than the exterior of the sleeve, one of the wheels being pressed on the outer end of said sleeve, and having its hub projecting over the outer collar, a packing-ring interposed between the rear end of the sleeve and rear collar, and a supplemental sleeve fitted to slide over the rear collar, packing-ring, and end of the divided sleeve, and clamped to the latter, all constructed and combined substantially in the manner hereinafter more fully described.

Figure 1:
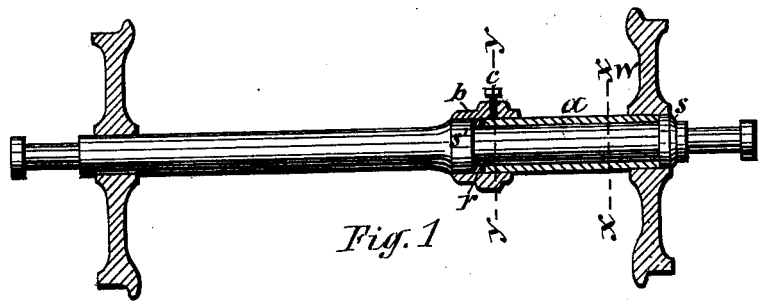
Figure 2:
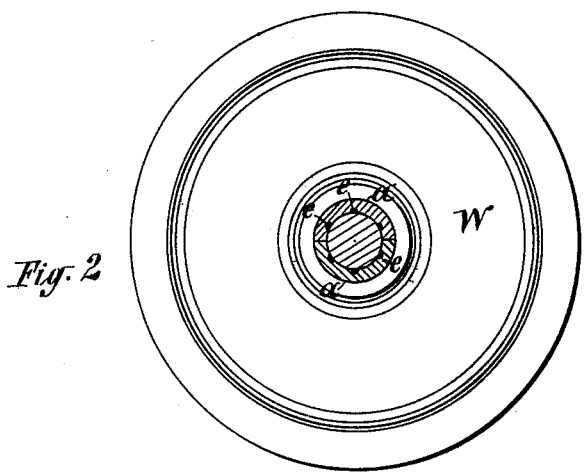
Figure 3:
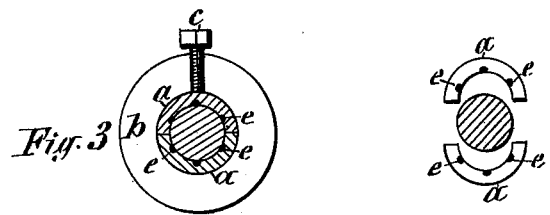
Figure 4:

In the accompanying drawing, Figure 1 is a longitudinal section of a car-axle provided with my improvements; Fig. 2, an enlarged transverse section on line $x$ $x$ of Fig. 1; Fig. 3, an enlarged transverse section on line $y$ $y$ of Fig. 1, and Fig. 4 an interior view of one of the sections of sleeve detached.

Similar letters of reference indicate corresponding parts.

$a$ represents the sleeve fitted loosely to the axle, and hitherto consisting of one piece.

Since this sleeve is subjected to considerable wear and strain, it is essential, first, to protect it as much as possible against those effects, and, second, to facilitate its repair. To attain this object I construct the sleeve $a$ of two or more longitudinal sections, and fit them endwise between two collars or shoulders, $s$ $s'$, forged or shrunk on the axle, so as to be permanently attached thereto. These collars are of a smaller circumference than the exterior of the sleeve $a$, so as to allow the wheel W to be pressed on or off the sleeve in the same manner as stationary wheels are applied to and removed from their axles. The sections of the sleeve thus confined in the eye of the wheel become firmly united, and form a sleeve nearly or quite as rigid as if composed of one piece.

To form a guard against the entrance of dust at the outer end of the sleeve, the hub of the wheel is made to project over the outer collar $s$ and cover the joint between it and the end of the sleeve, as illustrated in Fig. 1 of the drawing. $r$ is an anti-friction metal ring interposed between the rear end of sleeve $a$ and the adjacent collar $s'$, for the purpose of preventing undue wear of the respective parts at that point, and of compensating for such wearing, and thus adjusting the wheel to the gage of the track. $b$ is a supplemental sleeve of a diameter to pass over the rear collar $s'$, ring $r$, and end of sleeve $a$, and is provided with a set-screw, $c$, by means of which it is clamped on the sleeve $a$, thus giving additional strength to the sectional sleeve, and at the same time holding in position the ring $r$, which is inserted in sections, and covering the joint between the sleeve and collar, to prevent admission of dust, and the consequent danger of cutting the bearings.

To further guard against undue wearing of the sleeve $a$ and axle, and augment its durability, the interior of the sleeve $a$ may be provided with anti-friction bearings $e$ $e$, which by my improved construction of the sleeve I am enabled to apply with great facility.

The advantages of my improvements are obvious. The sleeve $a$, being composed of sections, is easily made and fitted to the axle, and readily applied without necessitating the removal or disturbance of the shoulders or collars, which require great strength and rigidity in their position on the axle. The wheel is attached to the sleeve with equal facility, the dust is excluded from the ends of the sleeve, and the repair or renewal of the respective parts greatly facilitated.

Having thus described my invention, what I claim is—

1. The sleeve $a$, composed of two or more longitudinal sections, secured to each other by the wheel W, pressed onto one end, and a collar or supplemental sleeve, $b$, fitted to its exterior at the opposite end, in combination with a car-axle having rigid shoulders at the ends of said sectional sleeve, substantially as described.

2. The combination and arrangement of the sleeve $a$, composed of two or more longitudinal sections, fitted between shoulders $s$ $s'$, forged or shrunk on the axle, so as to be permanently attached thereto, and of a smaller circumference than the exterior of the sleeve $a$, the wheel W, pressed onto the outer end of said sleeve, and having its hub projecting over the collar $s$, the packing-ring $r$, interposed between the rear end of the sleeve $a$ and collar $s'$, and the supplemental sleeve $b$, fitted to slide over collar $s'$, packing-ring $r$, and end of sleeve $a$, and clamped to the latter, all constructed and arranged substantially as described and shown, for the purposes set forth.

In testimony whereof I have hereunto set my hand this 2d day of March, 1878.

HENRY WATKEYS.

Witnesses:
I. C. LAASS,
J. C. A. DE LIMA.